United States Patent
Chen

(10) Patent No.: US 11,240,050 B2
(45) Date of Patent: Feb. 1, 2022

(54) ONLINE DOCUMENT SHARING METHOD AND APPARATUS, ELECTRONIC DEVICE, AND STORAGE MEDIUM

(71) Applicant: TIANJIN BYTEDANCE TECHNOLOGY CO., LTD., Tianjin (CN)

(72) Inventor: Xuejia Chen, Beijing (CN)

(73) Assignee: TIANJIN BYTEDANCE TECHNOLOGY CO., LTD., Tianjin (CN)

( * ) Notice: Subject to any disclaimer, the term of this patent is extended or adjusted under 35 U.S.C. 154(b) by 0 days.

(21) Appl. No.: 17/239,298

(22) Filed: Apr. 23, 2021

(65) Prior Publication Data

US 2021/0243045 A1    Aug. 5, 2021

Related U.S. Application Data

(63) Continuation of application No. PCT/CN2019/126344, filed on Dec. 18, 2019.

(30) Foreign Application Priority Data

Dec. 24, 2018 (CN) .......................... 201811582795.6

(51) Int. Cl.
*H04L 12/18* (2006.01)
*G06F 21/60* (2013.01)

(52) U.S. Cl.
CPC ........ *H04L 12/1822* (2013.01); *G06F 21/604* (2013.01); *G06F 2221/2141* (2013.01)

(58) Field of Classification Search
CPC .......................... H04L 12/1822; G06F 21/604
See application file for complete search history.

(56) References Cited

U.S. PATENT DOCUMENTS 8,126,129 B1 * 2/2012 McGuire ............... H04M 3/568
379/202.01
10,122,771 B2 * 11/2018 Broadworth ........ H04L 65/4038
(Continued)

FOREIGN PATENT DOCUMENTS

CN 103780695 A 5/2014
CN 104038722 A 9/2014
(Continued)

OTHER PUBLICATIONS

CN 103780695 (May 7, 2014 Publication of CN103780695A from IDS, GOOGLE translation, 6 pages) (Year: 2014).*
(Continued)

*Primary Examiner* — Oleg Korsak

(57) ABSTRACT

The present disclosure provides a method and apparatus for sharing an online document, an electronic device, and a storage medium. The method includes: providing (101) a sharing interface containing one or more candidate conference events based on a request from a currently logged-in user for sharing an online document; obtaining (102) a target conference event selected by the currently logged-in user from the one or more first candidate conference events, and obtaining an operation permission for the online document set by the currently logged-in user for the target conference event; then, obtaining (103) a participant account number participating in the target conference event, and setting an operation permission of a participant corresponding to the participant account number for the online document based on the operation permission; and sending (104) prompt information to the participant, such that the participant accesses the online document based on the prompt information.

15 Claims, 4 Drawing Sheets

(56) References Cited

U.S. PATENT DOCUMENTS

| | | | |
|---|---|---|---|
| 10,664,580 B2* | 5/2020 | Huang | G06K 9/6274 |
| 2006/0026502 A1* | 2/2006 | Dutta | H04L 12/1822 |
| | | | 715/230 |
| 2007/0106754 A1* | 5/2007 | Moore | G06F 21/604 |
| | | | 709/217 |
| 2008/0112336 A1* | 5/2008 | Gray | H04L 47/783 |
| | | | 370/260 |
| 2010/0251119 A1* | 9/2010 | Geppert | H04L 65/403 |
| | | | 715/716 |
| 2011/0314397 A1* | 12/2011 | Ogle | H04M 3/565 |
| | | | 715/764 |
| 2016/0004820 A1* | 1/2016 | Moore | H04L 63/1441 |
| | | | 705/3 |
| 2017/0006162 A1* | 1/2017 | Bargetzi | H04W 4/06 |
| 2017/0353466 A1 | 12/2017 | Weaver et al. | |
| 2018/0143950 A1 | 5/2018 | al-Arnaouti et al. | |
| 2019/0288902 A1 | 9/2019 | He et al. | |
| 2019/0327104 A1* | 10/2019 | Kagawa | H04L 67/06 |
| 2020/0228358 A1* | 7/2020 | Rampton | G06N 20/00 |
| 2020/0259673 A1* | 8/2020 | Aono | H04L 12/1818 |
| 2020/0294000 A1* | 9/2020 | Sexauer | G06Q 10/1095 |

FOREIGN PATENT DOCUMENTS

| | | |
|---|---|---|
| CN | 105187360 A | 12/2015 |
| CN | 105790962 A | 7/2016 |
| CN | 106998329 A | 8/2017 |
| CN | 107508740 A | 12/2017 |
| CN | 109669924 A | 4/2019 |
| WO | 2018177106 A1 | 4/2018 |

OTHER PUBLICATIONS

CN Patent Application No. 201811582795.6, Rejection Decision dated Feb. 8, 2021, 5 pages with English Translation.

CN Patent Application No. 201811582795.6, 2nd Office Action and Supplementary Search dated Sep. 21, 2020, 10 pages with English Translation.

CN Patent Application No. 201811582795.6, 1st Office Action and Search Report dated Apr. 15, 2020, 10 pages with English Translation.

International Patent Application No. PCT/CN2019/126344, International Search Report dated Mar. 18, 2020, 6 pages with English Translation.

* cited by examiner

ONLINE DOCUMENT SHARING METHOD AND APPARATUS, ELECTRONIC DEVICE, AND STORAGE MEDIUM

CROSS-REFERENCE TO RELATED APPLICATION

The present application is a continuation of International Application No. PCT/CN2019/126344, filed on Dec. 18, 2019, which claims priority to Chinese patent Application No. 2018/11582795.6, titled "ONLINE DOCUMENT SHARING METHOD AND APPARATUS, ELECTRONIC DEVICE, AND STORAGE MEDIUM", and filed by Tianjin Bytedance Technology Co., Ltd., on Dec. 24, 2018.

TECHNICAL FIELD

The present disclosure relates to the field of computer technologies, and more particularly, to a method and apparatus for sharing an online document, an electronic device, and a storage medium.

BACKGROUND

With the development of Internet technologies, the number of applications supported by the Internet is becoming increasingly larger, and online documents are an important form of Internet applications. Online documents are an extension of traditional desktop word processing applications in Internet applications. Online document technology has gradually eliminated users' dependence on processing software.

Currently, for an online document, a user can share the online document with other users, and can set operation permissions for the online document for other users.

In the related art, in a process of sharing the online document, the user can share the online document with a single user or a certain group in instant messaging software. Since the dimension of sharing provided in the related art only supports sharing with a user or a group object, this sharing scheme has low flexibility.

SUMMARY

The present disclosure provides a method and apparatus for sharing an online document, an electronic device, and a storage medium, capable of expanding the dimension of sharing of the online document, so that a user may set operation permissions for the online document on a basis of a dimension of a conference event and share the online document with participants of the conference event.

According to an embodiment in a first aspect of the present disclosure, a method for sharing an online document is provided. The method includes: providing a sharing interface based on a request from a currently logged-in user for sharing an online document, the sharing interface providing one or more first candidate conference events; obtaining a target conference event selected by the currently logged-in user from the one or more first candidate conference events, and obtaining an operation permission for the online document set by the currently logged-in user for the target conference event; obtaining a participant account number participating in the target conference event, and setting an operation permission of a participant corresponding to the participant account number for the online document based on the operation permission; and sending prompt information to the participant corresponding to the participant account number, such that the participant accesses the online document based on the prompt information.

In an embodiment of the present disclosure, the operation of providing the sharing interface based on the request from the currently logged-in user for sharing the online document may include: receiving a trigger operation of the currently logged-in user on a sharing control on a page where the online document is provided; and providing the sharing interface based on the trigger operation.

In an embodiment of the present disclosure, the method may further include, prior to providing the sharing interface: obtaining one or more conference events recorded in a calendar of the currently logged-in user; and determining the one or more first candidate conference events based on the one or more conference events recorded in the calendar.

In an embodiment of the present disclosure, the sharing interface may further provide a search input box, and the operation of obtaining the target conference event selected by the currently logged-in user from the one or more first candidate conference events may include: receiving a keyword related to the target conference event inputted by the currently logged-in user to the search input box; obtaining, from the one or more first candidate conference events, one or more second candidate conference events matching the keyword; and obtaining the target conference event selected by the currently logged-in user from the one or more second candidate conference events.

In an embodiment of the present disclosure, the sharing interface may further provide a voice input interface, and the operation of obtaining the target conference event selected by the currently logged-in user from the one or more first candidate conference events may include: obtaining voice information inputted by the currently logged-in user through the voice input interface, the voice information including content related to the target conference event; determining one or more second candidate conference events matching the voice information based on conference information of the one or more first candidate conference events and the voice information; and obtaining the target conference event selected by the currently logged-in user from the one or more second candidate conference events.

With the method for sharing an online document according to the embodiment of the present disclosure, a sharing interface containing one or more candidate conference events is provided based on a request from a currently logged-in user for sharing an online document. A target conference event selected by the currently logged-in user from the one or more first candidate conference events is obtained, and an operation permission for the online document set by the currently logged-in user for the target conference event is obtained. Then, a participant account number participating in the target conference event is obtained, and an operation permission of the participant corresponding to the participant account number for the online document is set based on the operation permission, and prompt information is sent to the participant, such that the participant accesses the online document based on the prompt information. In this way, the dimension of sharing the online document can be expanded, so that the user can set the operation permission for the online document on a basis of a dimension of a conference event and share the online document with participants of the conference event.

To achieve the above object, according to an embodiment in a second aspect of the present disclosure, an apparatus for sharing an online document is provided. The apparatus includes: a providing module configured to provide a sharing interface based on a request from a currently logged-in user for sharing an online document, the sharing interface providing one or more first candidate conference events; a first obtaining module configured to obtain a target conference event selected by the currently logged-in user from the one or more first candidate conference events, and obtain an operation permission for the online document set by the currently logged-in user for the target conference event; a second obtaining module configured to obtain a participant account number participating in the target conference event, and set an operation permission of a participant corresponding to the participant account number for the online document based on the operation permission; and a sending module configured to send prompt information to the participant corresponding to the participant account number, such that the participant accesses the online document based on the prompt information.

In an embodiment of the present disclosure, the providing module may be configured to: receive a trigger operation of the currently logged-in user on a sharing control on a page where the online document is provided; and provide the sharing interface based on the trigger operation.

In an embodiment of the present disclosure, the apparatus may further include: a third obtaining module configured to obtain one or more conference events recorded in a calendar of the currently logged-in user; and a determination module configured to determine the one or more first candidate conference events based on the one or more conference events recorded in the calendar.

In an embodiment of the present disclosure, the sharing interface may further provide a search input box, and the first obtaining module may be configured to: receive a keyword related to the target conference event inputted by the currently logged-in user to the search input box; obtain, from the one or more first candidate conference events, one or more second candidate conference events matching the keyword; and obtain the target conference event selected by the currently logged-in user from the one or more second candidate conference events.

In an embodiment of the present disclosure, the sharing interface may further provide a voice input interface, and the first obtaining module may be configured to: obtain voice information inputted by the currently logged-in user through the voice input interface, the voice information including content related to the target conference event; determine one or more second candidate conference events matching the voice information based on conference information of the one or more first candidate conference events and the voice information; and obtain the target conference event selected by the currently logged-in user from the one or more second candidate conference events.

With the apparatus for sharing an online document according to the embodiment of the present disclosure, a sharing interface containing one or more candidate conference events is provided based on a request from a currently logged-in user for sharing an online document. A target conference event selected by the currently logged-in user from the one or more first candidate conference events is obtained, and an operation permission for the online document set by the currently logged-in user for the target conference event is obtained. Then, a participant account number participating in the target conference event is obtained, and an operation permission of the participant corresponding to the participant account number for the online document is set based on the operation permission, and prompt information is sent to the participant, such that the participant accesses the online document based on the prompt information. In this way, the dimension of sharing the online document can be expanded, so that the user can set the operation permission for the online document on a basis of a dimension of a conference event and share the online document with participants of the conference event.

To achieve the above object, according to an embodiment in a third aspect of the present disclosure, an electronic device is provided. The electronic device includes a memory, a processor, and a computer program stored in the memory and executable by the processor. The processor executes the program to: provide a sharing interface based on a request from a currently logged-in user for sharing an online document, the sharing interface providing one or more first candidate conference events; obtain a target conference event selected by the currently logged-in user from the one or more first candidate conference events, and obtain an operation permission for the online document set by the currently logged-in user for the target conference event; obtain a participant account number participating in the target conference event, and set an operation permission of a participant corresponding to the participant account number for the online document based on the operation permission; and send prompt information to the participant corresponding to the participant account number, such that the participant accesses the online document based on the prompt information.

To achieve the above object, according to an embodiment in a fourth aspect of the present disclosure a non-transitory computer-readable storage medium is provided. The non-transitory computer-readable storage medium has a computer program stored thereon. The program is executed by the processor to: provide a sharing interface based on a request from a currently logged-in user for sharing an online document, the sharing interface providing one or more first candidate conference events; obtain a target conference event selected by the currently logged-in user from the one or more first candidate conference events, and obtain an operation permission for the online document set by the currently logged-in user for the target conference event; obtain a participant account number participating in the target conference event, and set an operation permission of a participant corresponding to the participant account number for the online document based on the operation permission; and send prompt information to the participant corresponding to the participant account number, such that the participant accesses the online document based on the prompt information.

Additional aspects and advantages of the present disclosure will be given at least in part in the following description, or become apparent at least in part from the following description, or can be learned from practicing of the present disclosure.

BRIEF DESCRIPTION OF DRAWINGS

The above and/or additional aspects and advantages of the present disclosure will become more apparent and more understandable from the following description of embodiments taken in conjunction with the accompanying drawings, in which.

DESCRIPTION OF EMBODIMENTS

Figure 1:
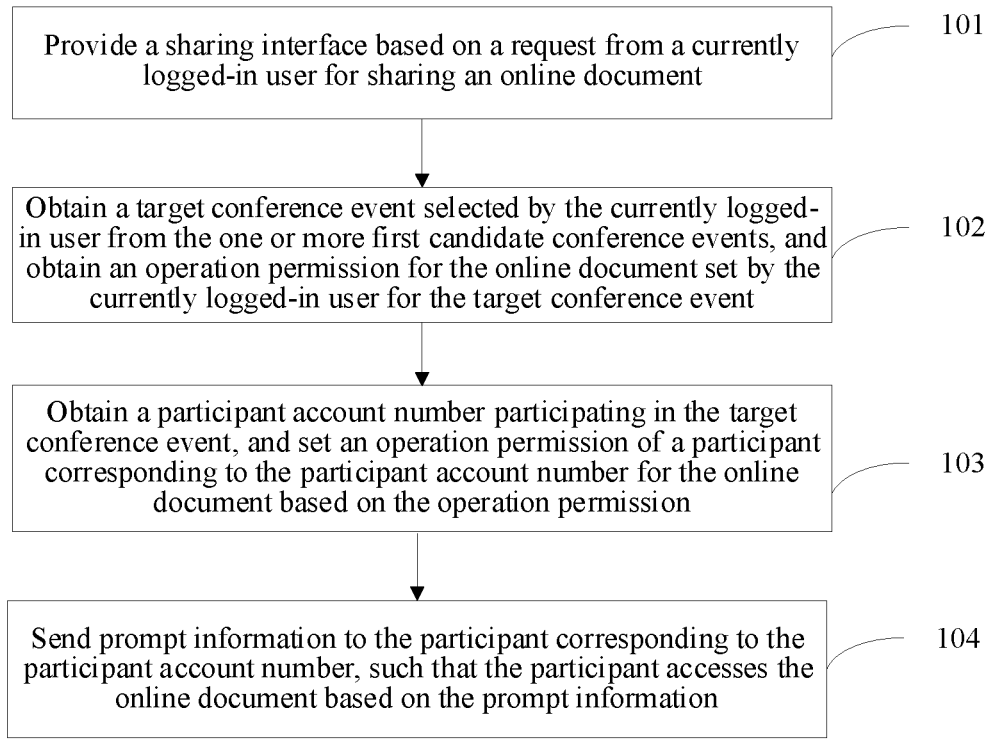
FIG. 1 is a flowchart illustrating a method for sharing an online document according to an embodiment of the present disclosure.

The embodiments of the present disclosure will be described in detail below with reference to examples thereof as illustrated in the accompanying drawings, throughout which same or similar elements, or elements having same or similar functions, are denoted by same or similar reference numerals. The embodiments described below with reference to the drawings are illustrative only, and are intended to explain, rather than limiting, the present disclosure.

A method and apparatus for sharing an online document, an electronic device, and a storage medium according to the embodiments of the present disclosure will be described below with reference to the figures.

In a process of sharing an online document, since a dimension of sharing provided in the related art only supports sharing with a user account or a group object, the dimension of sharing is limited. In some scenarios, for example, instant messaging software has a conference scheduling function. After a conference organizer invites participants to participate in a conference, a conference event will be recorded in the instant messaging software, e.g., the conference event may be generated in a calendar application of each participant. In this case, if one participant needs to share an online document with participants in the conference, the user needs to first determine the corresponding participants according to conference information of the conference event in the calendar, and then, in order to share the online document, select the corresponding participants, and set an operation permission of each participant for the online document. It can be seen that, as a result, the process for the user to share the online document with the participants of the conference is relatively complicated, with quite a few user operations, leading to a poor user experience for the user to share the online document with the participants of the conference, especially when there are many participants.

To this end, the present disclosure provides a method for sharing an online document, capable of expanding the dimension of sharing the online document so that a user may share the online document based on a dimension of a conference event and set an operation permission for the conference event for the online document, thereby facilitating the sharing of the online document by the user with participants based on the dimension of the conference event.

FIG. 1 is a flowchart illustrating a method for sharing an online document according to an embodiment of the present disclosure.

As illustrated in FIG. 1, the method for sharing the online document includes the following steps.

At step 101, a sharing interface is provided based on a request from a currently logged-in user for sharing an online document.

The sharing interface provides one or more first candidate conference events.

It can be appreciated that the method for sharing the online document according to the embodiment of the present disclosure can be performed by an apparatus for sharing an online document. The apparatus for sharing the online document may be provided in software with an instant messaging function, or in software with an online document function only.

The embodiments of the present disclosure will be described with reference to an example in which the apparatus for sharing the online document is provided in software with the instant messaging function.

It is to be noted that the software can be provided in an electronic device. The electronic device may include, but not limited to, a personal computer, a tablet computer, a mobile phone, etc., with various operating systems.

It is to be noted that in different application scenarios, there may be various ways to provide the sharing interface based on the request from the currently logged-in user for sharing the online document. Some examples will be given as follows.

As an example, a sharing control can be provided on a page where the online document is provided. If a trigger operation performed by the currently logged-in user on the sharing control on the page where the online document is provided is received, the sharing interface can be provided based on the trigger operation.

As another example, the currently logged-in user can perform a predetermined operation corresponding to the sharing request on the page where the online document is provided. If it is monitored that the user performs the predetermined operation, it can be determined that a request from the user for sharing a current online document is received, and the sharing interface can be provided based on the sharing request.

The predetermined operation may include, but not limited to, an operation such as double-clicking the page where the online document is provided, long-pressing a title of the online document, etc. In practical applications, the predetermined operation corresponding to the sharing request may be set based on application requirements, and this embodiment is not limited to any of these examples.

As another example, a voice input interface can be provided on the page where the online document is provided. Voice information inputted by the user can be obtained through the voice input interface. When it is determined that the voice information inputted by the user matches a voice instruction corresponding to the sharing request, the sharing interface is provided.

In other words, the currently logged-in user may initiate the request for sharing the online document using his/her voice.

It can be appreciated that the sharing interface also provides options such as contacts and groups.

The above online document may include, but not limited to, an online word document, an online Excel document, or a PowerPoint document, and this embodiment is not limited to any of these examples.

At step 102, a target conference event selected by the currently logged-in user from the one or more first candidate conference events is obtained, and an operation permission for the online document set by the currently logged-in user for the target conference event is obtained.

The operation permission may include, but not limited to, a permission to edit, read, and/or comment.

As an exemplary implementation, in order to facilitate setting the operation permission for the online document by the user for the conference event, a conference name and a permission option may be provided in each conference event option. The user may select the target conference event based on the conference name. After the user selects the target conference event, the operation permission for the target conference event for the online document may be directly set through a permission control on an option for the target conference event.

It is to be noted that in different application scenarios, there may be various ways to obtain the target conference event selected by the currently logged-in user from the one or more first candidate conference events. Some examples will be given as follows.

Example 1

Figure 2:
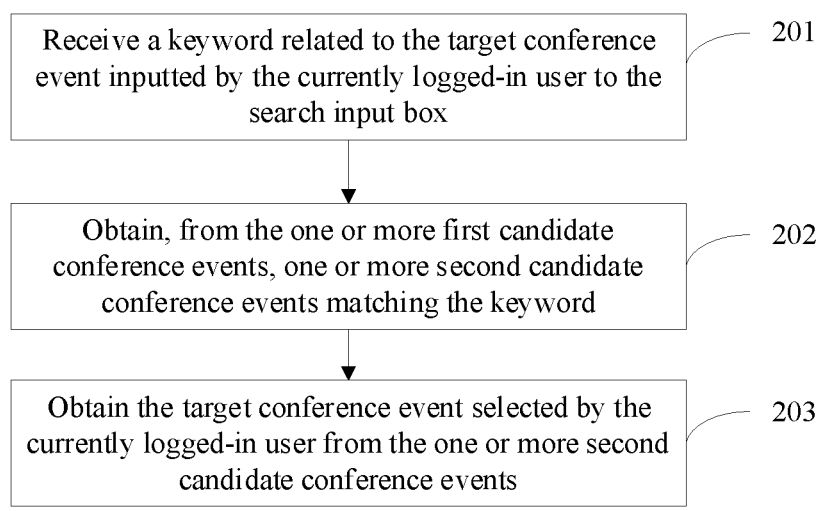
FIG. 2 is a flowchart illustrating in detail a process of obtaining a target conference event selected by a currently logged-in user from one or more first candidate conference events.

In this example, a search input box can be further provided on the sharing interface. As illustrated in FIG. 2, the above operation of obtaining the target conference event selected by the currently logged-in user from the one or more first candidate conference events may include the following steps.

At step 201, a keyword related to the target conference event inputted by the currently logged-in user to the search input box is received.

As an exemplary implementation, the currently logged-in user may provide a keyword such as a conference name, a conference location, or conference time corresponding to the target conference event in the search input box.

At step 202, one or more second candidate conference events matching to the keyword is obtained from the one or more first candidate conference events.

Specifically, after obtaining the keyword inputted by the currently logged-in user, the keyword may be matched with conference information corresponding to the one or more first candidate conference events, and the one or more second candidate conference events corresponding to the keyword may be determined based on a matching result.

Here, there may be one or more first candidate conference events.

The conference information may include, but not limited to, a conference name, conference time, conference location, and participant information.

For example, the currently logged-in user can input time A as the conference time to the search input box, and may determine one or more candidate conference events corresponding to time A from a pre-stored correspondence between candidate conference events and conference information. At this time, the sharing interface may display the determined candidate conference event(s), and the user may select the target conference event from the determined candidate conference event(s).

At step 203, the target conference event selected by the currently logged-in user from the one or more second candidate conference events is obtained.

In this example, the search input box is provided on the sharing interface, such that the currently logged-in user may quickly determine the target conference event from a number of candidate conference events based on the keyword corresponding to the target conference event, thereby facilitating selection of the target conference event from the number of candidate conference events by the user.

Example 2

Figure 3:
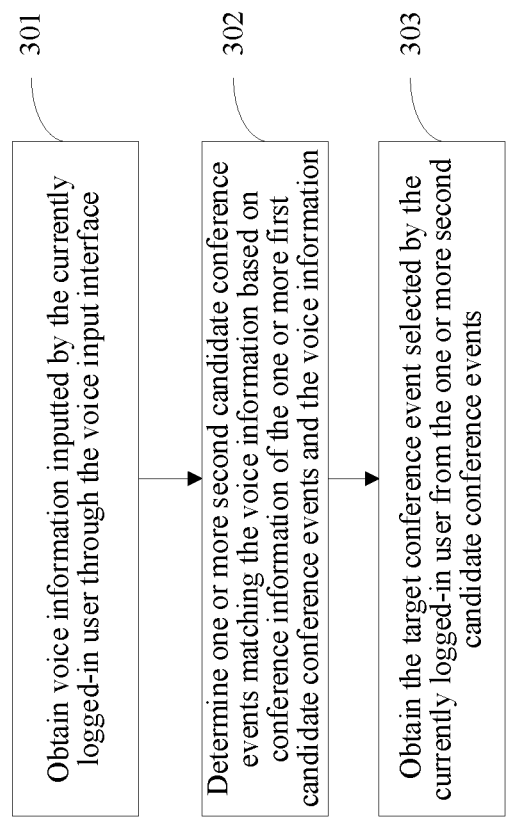
FIG. 3 is a flowchart illustrating in detail a process of obtaining a target conference event selected by a currently logged-in user from one or more first candidate conference events.

In this example, the voice input interface may be further provided on the sharing interface. As illustrated in FIG. 3, the operation of obtaining the target conference event selected by the currently logged-in user from the one or more first candidate conference events may include the following steps.

At step 301, voice information inputted by the currently logged-in user through the voice input interface is obtained.

The voice information may include content related to the target conference event.

The content related to the target conference event may include, but not limited to, a conference name, conference time, and a conference location of the target conference event, and this embodiment is not limited to these examples.

At step 302, one or more second candidate conference events matching the voice information are determined based on conference information of the one or more first candidate conference events and the voice information.

At step 303, the target conference event selected by the currently logged-in user from the one or more second candidate conference events is obtained.

In this example, a voice-based scheme can be provided for the user to select the target conference event, which facilitates selection of the target conference event by the user using his/her voice.

At step 103, a participant account number participating in the target conference event is obtained, and an operation permission of a participant corresponding to the participant account number for the online document is set based on the operation permission.

Specifically, after the currently logged-in user sets the operation permission for the online document for the target conference event, the participant account number corresponding to the target conference event can be determined based on a pre-stored correspondence between conference events and participant account numbers, and the operation permission of the participant corresponding to the participant account number for the online document can be set based on the operation permission set by the currently logged-in user for the target conference event.

It is to be noted that the operation permission for the online document for the target conference event may be the same as the operation permission of the participant participating in the target conference event for the online document.

The participant account number may include a group identifier and/or a personal identifier of the participant.

At step 104, prompt information is sent to the participant corresponding to the participant account number, such that the participant accesses the online document based on the prompt information.

The prompt information may include an access address of the online document and the operation permission of the participant for the online document. As a result, the participant may be aware of his/her operation permission for the online document based on the prompt information.

With the method for sharing an online document according to the embodiment of the present disclosure, a sharing interface containing one or more candidate conference events is provided based on a request from a currently logged-in user for sharing an online document. A target conference event selected by the currently logged-in user from the one or more first candidate conference events is obtained, and an operation permission for the online document set by the currently logged-in user for the target conference event is obtained. Then, a participant account number participating in the target conference event is obtained, and an operation permission of the participant corresponding to the participant account number for the online document is set based on the operation permission, and prompt information is sent to the participant, such that the participant accesses the online document based on the prompt information. In this way, the dimension of sharing the online document can be expanded, so that the user can set the operation permission for the online document on a basis of a dimension of a conference event and share the online document with participants of the conference event.

It is to be noted that, in order to accurately provide the user with the candidate conference event(s), as an exemplary implementation, before providing the sharing interface, the candidate conference event(s) to be displayed in the sharing interface may be determined based on the conference event(s) recorded in the calendar corresponding to the currently logged-in user.

Figure 4:
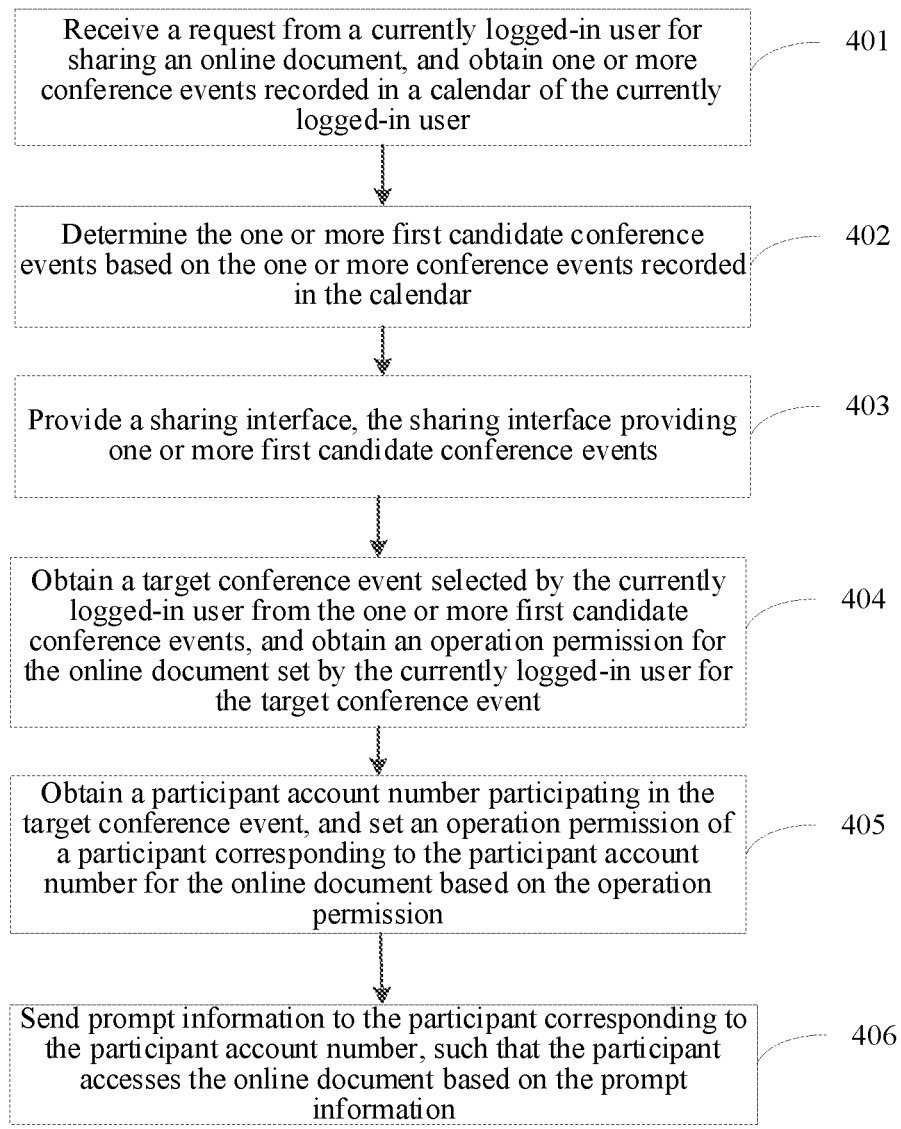
FIG. 4 is a flowchart illustrating a method for sharing an online document according to another embodiment of the present disclosure.

FIG. 4 is a flowchart illustrating a method for sharing an online document according to another embodiment of the present disclosure.

As illustrated in FIG. 4, the method for sharing the online document includes the following steps.

At step 401, a request from a currently logged-in user for sharing an online document is received, and one or more conference events recorded in a calendar of the currently logged-in user is obtained.

At step 402, the one or more first candidate conference events is determined based on the one or more conference events recorded in the calendar.

At step 403, a sharing interface is provided. The sharing interface provides one or more first candidate conference events.

At step 404, a target conference event selected by the currently logged-in user from the one or more first candidate conference events is obtained, and an operation permission for the online document set by the currently logged-in user for the target conference event is obtained.

At step 405, a participant account number participating in the target conference event is obtained, and an operation permission of a participant corresponding to the participant account number for the online document is set based on the operation permission.

At step 406, prompt information is sent to the participant corresponding to the participant account number, such that the participant accesses the online document based on the prompt information.

With the method for sharing the online document according to the embodiment of the present disclosure, a request for sharing an online document from a currently logged-in user is received. One or more candidate conference events are determined based on the conference event(s) recorded in the calendar of the currently logged-in user. The determined candidate conference event(s) can be displayed on the interface provided. As a result, the candidate conference event(s) can be provided accurately, which facilitates determining of the corresponding target conference event by the currently logged-in user accurately from the candidate conference event(s).

To implement the above embodiments, an embodiment of the present disclosure further provides an apparatus for sharing an online document.

Figure 5:
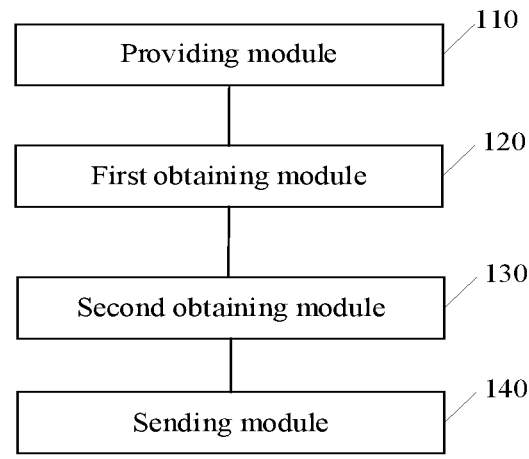
FIG. 5 is a block diagram showing a structure of an apparatus for sharing an online document according to an embodiment of the present disclosure.

FIG. 5 is a block diagram showing a structure of an apparatus for sharing an online document according to an embodiment of the present disclosure.

As illustrated in FIG. 5, the apparatus for sharing the online document may include a providing module 110, a first obtaining module 120, a second obtaining module 130, and a sending module 140.

The providing module 110 is configured to provide a sharing interface based on a request from a currently logged-in user for sharing an online document.

The sharing interface provides one or more first candidate conference events.

The first obtaining module 120 is configured to obtain a target conference event selected by the currently logged-in user from the one or more first candidate conference events, and to obtain an operation permission for the online document set by the currently logged-in user for the target conference event.

The second obtaining module 130 is configured to obtain a participant account number participating in the target conference event, and to set an operation permission of a participant corresponding to the participant account number for the online document based on the operation permission.

The sending module 140 is configured to send prompt information to the participant corresponding to the participant account number, such that the participant accesses the online document based on the prompt information.

The prompt information may include an access address of the online document and the operation permission of the participant for the online document. As a result, the participant may be aware of his/her operation permission for the online document based on the prompt information.

In an embodiment of the present disclosure, the providing module 110 may be configured to: receive a trigger operation of the currently logged-in user on a sharing control on a page where the online document is provided; and provide the sharing interface based on the trigger operation.

Figure 6:
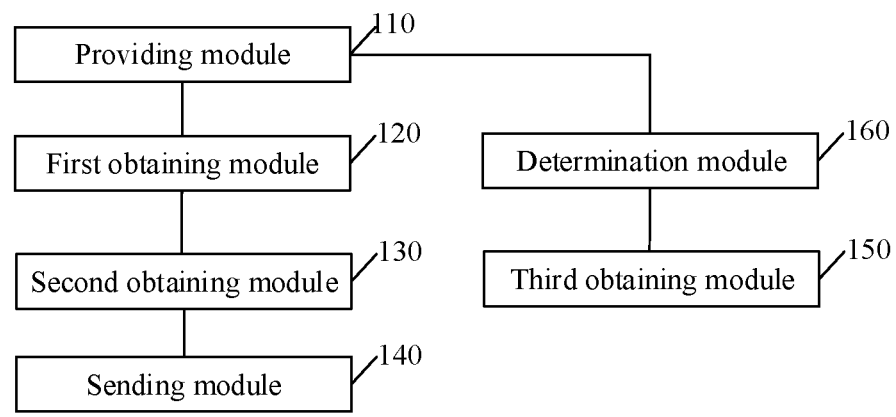
FIG. 6 is a block diagram showing a structure of an apparatus for sharing an online document according to another embodiment of the present disclosure.

In an embodiment of the present disclosure, in order to improve the accuracy of the candidate conference event(s) provided in the sharing interface, on the basis of FIG. 5, the apparatus may further include a third obtaining module 150 and a determination module 160, as illustrated in FIG. 6.

The third obtaining module 150 is configured to obtain one or more conference events recorded in a calendar of the currently logged-in user.

The determination module 160 is configured to determine the one or more first candidate conference events based on the one or more conference events recorded in the calendar.

In an embodiment of the present disclosure, when the sharing interface is provided with a search input box, the first obtaining module 120 can be configured to: receive a keyword related to the target conference event inputted by the currently logged-in user to the search input box; obtain, from the one or more first candidate conference events, one or more second candidate conference events matching the keyword; and obtain the target conference event selected by the currently logged-in user from the one or more second candidate conference events.

In an embodiment of the present disclosure, when the sharing interface is provided with a voice input interface, the first obtaining module 120 can be configured to: obtain voice information inputted by the currently logged-in user through the voice input interface, the voice information including content related to the target conference event; determine one or more second candidate conference events matching the voice information based on conference information of the one or more first candidate conference events and the voice information; and obtain the target conference event selected by the currently logged-in user from the one or more second candidate conference events.

It is to be noted that the above description of the embodiments of the method for sharing the online document is also applicable to the apparatus for sharing the online document according to the embodiments, and thus details thereof will not be repeated here.

With the apparatus for sharing an online document according to the embodiment of the present disclosure, a sharing interface containing one or more candidate conference events is provided based on a request from a currently logged-in user for sharing an online document. A target conference event selected by the currently logged-in user from the one or more first candidate conference events is obtained, and an operation permission for the online document set by the currently logged-in user for the target conference event is obtained. Then, a participant account number participating in the target conference event is obtained, and an operation permission of the participant corresponding to the participant account number for the online document is set based on the operation permission, and prompt information is sent to the participant, such that the participant accesses the online document based on the prompt information. In this way, the dimension of sharing the online document can be expanded, so that the user can set the operation permission for the online document on a basis of a dimension of a conference event and share the online document with participants of the conference event.

To implement the above embodiments, an embodiment of the present disclosure further provides an electronic device. The electronic device includes a memory, a processor, and a computer program stored in the memory and executable by the processor. The processor executes the program to: provide a sharing interface based on a request from a currently logged-in user for sharing an online document, the sharing interface providing one or more first candidate conference events; obtain a target conference event selected by the currently logged-in user from the one or more first candidate conference events, and obtain an operation permission for the online document set by the currently logged-in user for the target conference event; obtain a participant account number participating in the target conference event, and set an operation permission of a participant corresponding to the participant account number for the online document based on the operation permission; and send prompt information to the participant corresponding to the participant account number, such that the participant accesses the online document based on the prompt information.

Figure 7:
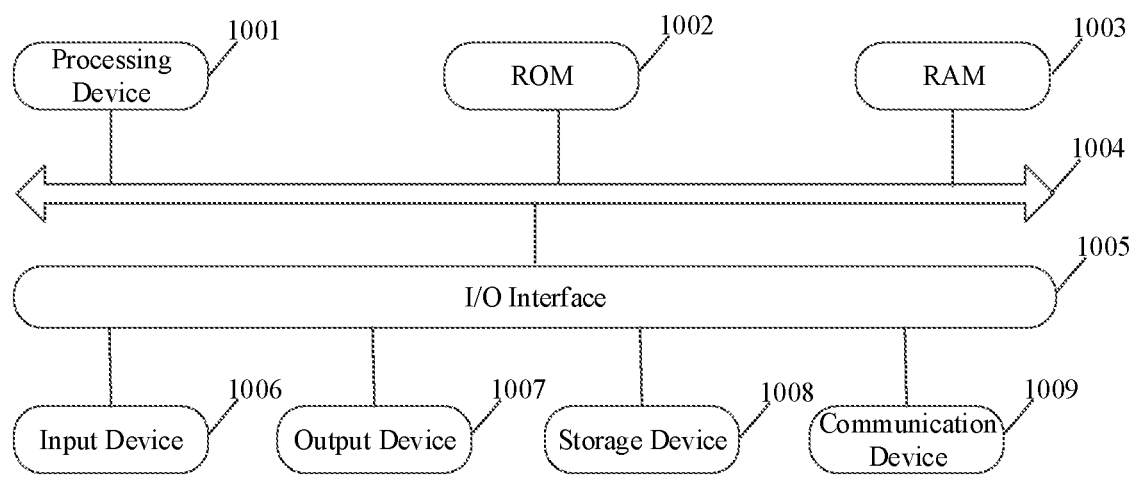
FIG. 7 is a schematic diagram showing an electronic device configured to perform a method for sharing an online document according to an embodiment of the present disclosure.

Reference is now made to FIG. 7, which is a schematic diagram showing an electronic device 1000 adapted to implement the embodiments of the present disclosure. The electronic device according to the embodiment of the present disclosure may include, but not limited to, a mobile terminal such as a mobile phone, a laptop computer, a digital broadcast receiver, a Personal Digital Assistant (PDA), a tablet computer or PAD, a Portable Multimedia Player (PMP), or a vehicle-mounted terminal (e.g., a vehicle-mounted navigation terminal), or a fixed terminal such as a digital TV, a desktop computer, etc. The electronic device illustrated in FIG. 7 is exemplary only, and should not be construed as limiting the function and scope of use of the embodiments of the present disclosure.

As illustrated in FIG. 7, the electronic device 1000 may include a processing device (such as a central processing unit, a graphics processing unit, etc.) 1001, which may perform various appropriate actions and processes in accordance with programs stored in a Read Only Memory (ROM) 1002 or loaded from a storage device 1008 into a Random Access Memory (RAM) 1003. In the RAM 1003, various programs and data required for operation of the electronic device 1000 may also be stored. The processing device 1001, the ROM 1002, and the RAM 1003 are connected to each other through a bus 1004. An Input/Output (I/O) interface 1005 is also connected to the bus 1004.

Generally, the following devices may be connected to the I/O interface 1005: an input device 1006 including, for example, a touch screen, a touch pad, a keyboard, a mouse, a camera, a microphone, an accelerometer, a gyroscope, etc.; an output device 1007 including, for example, a Liquid Crystal Display (LCD), a speaker, an oscillator, etc.; the storage device 1008 including, for example, a magnetic tape or a hard disk; and a communication device 1009. The communication device 1009 may allow the electronic device 1000 to perform wireless or wired communication with other devices for data exchange. Although FIG. 7 illustrates the electronic device 1000 having various devices, it can be appreciated that it is not necessary to implement or provide all the illustrated devices. Alternatively, more or fewer devices may be implemented or provided.

In particular, according to an embodiment of the present disclosure, the processes described above with reference to the flowcharts may be implemented as computer software programs. For example, an embodiment of the present disclosure includes a computer program product, which includes a computer program carried on a computer-readable medium. The computer program includes program codes for implementing the method illustrated in any of the flowcharts. In these embodiments, the computer program may be downloaded and installed from a network through the communication device 1009, or installed from the storage device 1008, or installed from the ROM 1002. When the computer program is executed by the processing device 1001, the above-mentioned functions defined in the methods according to the embodiments of the present disclosure are performed.

It is to be noted that the above computer-readable medium in the present disclosure may be a computer-readable signal medium or a computer-readable storage medium or any combination thereof. The computer-readable storage medium may be, but not limited to, for example, an electrical, magnetic, optical, electromagnetic, infrared, or semiconductor system, apparatus, or device, or any combination thereof. More specific examples of the computer-readable storage medium may include, but not limited to: an electrical connection having one or more wires, a portable computer disk, a hard disk, a Random Access Memory (RAM), a Read Only Memory (ROM), an Erasable Programmable Read Only Memory (EPROM) or a flash memory, an optical fiber, a Compact Disc Read-Only Memory (CD-ROM), an optical memory device, a magnetic memory device, or any suitable combination thereof. In the present disclosure, the computer-readable storage medium may be any tangible medium including or storing programs, which may be used by or used with an instruction execution system, apparatus, or device. However, in the present disclosure, the computer-readable signal medium may include a data signal propagated in a baseband or as a part of a carrier that carries computer-readable program codes. Such propagated data signal may be in various forms, including but not limited to an electromagnetic signal, an optical signal, or any suitable combination thereof. The computer-readable signal medium may be any computer-readable medium other than the computer-readable storage medium, which may transmit, propagate, or transfer programs used by or used with an instruction execution system, apparatus or device. The program codes stored on the computer-readable medium may be transmitted via any appropriate medium, including but not limited to electric cable, optical cable, Radio Frequency (RF), or any suitable combination thereof.

The above computer-readable medium may be included in the above electronic device; or may be standalone without being assembled into the electronic device.

The above computer-readable medium may carry one or more programs which, when executed by the electronic device, cause the electronic device to: provide a sharing interface based on a request from a currently logged-in user for sharing an online document, the sharing interface providing one or more first candidate conference events; obtain a target conference event selected by the currently logged-in user from the one or more first candidate conference events, and obtain an operation permission for the online document set by the currently logged-in user for the target conference event; obtain a participant account number participating in the target conference event, and set an operation permission of a participant corresponding to the participant account number for the online document based on the operation permission; and send prompt information to the participant corresponding to the participant account number, such that the participant accesses the online document based on the prompt information.

Alternatively, the above computer-readable medium may carry one or more programs which, when executed by the electronic device, cause the electronic device to: provide a sharing interface based on a request from a currently logged-in user for sharing an online document, the sharing interface providing one or more first candidate conference events; obtain a target conference event selected by the currently logged-in user from the one or more first candidate conference events, and obtain an operation permission for the online document set by the currently logged-in user for the target conference event; obtain a participant account number participating in the target conference event, and set an operation permission of a participant corresponding to the participant account number for the online document based on the operation permission; and send prompt information to the participant corresponding to the participant account number, such that the participant accesses the online document based on the prompt information.

The computer program codes for implementing the operations according to the embodiments of the present disclosure may be written in one or more programming languages or any combination thereof. The programming languages may include object-oriented programming languages, such as Java, Smalltalk, or C++, as well as conventional procedure-oriented programming languages, such as "C" language or similar programming languages. The program codes may be executed completely on a user computer, partly on the user computer, as a standalone software package, partly on the user computer and partly on a remote computer, or completely on the remote computer or server. In a case where the remote computer is involved, the remote computer may be connected to the user computer through any types of network, including a Local Area Network (LAN) or a Wide Area Network (WAN), or to an external computer (e.g., over the Internet by using an Internet service provider).

The flowcharts and block diagrams in the figures illustrate architectures, functions, and operations of possible implementations of systems, methods, and computer program products according to various embodiments of the present disclosure. In this regard, each block in the flowcharts or block diagrams may represent a module, a program segment, or a part of codes. The module, program segment, or part of codes may contain one or more executable instructions for implementing a specified logical function. It is also to be noted that, in some alternative implementations, functions showed in blocks may occur in a different order from the order shown in the figures. For example, two blocks illustrated in succession may actually be executed substantially in parallel with each other, or sometimes even in a reverse order, depending on functions involved. It is also to be noted that each block in the block diagrams and/or flowcharts, or any combination of the blocks in the block diagrams and/or flowcharts, may be implemented using a dedicated hardware-based system that is configured to perform specified functions or operations or using a combination of dedicated hardware and computer instructions.

Units involved and described in the embodiments of the present disclosure may be implemented in software or hardware. A name of a unit does not constitute a limitation on the unit itself under certain circumstances. For example, a first obtaining unit may also be described as "a unit for obtaining at least two Internet Protocol addresses".

What is claimed is:

1. A method for sharing an online document, comprising:
   providing a sharing interface based on a request from a currently logged-in user for sharing an online document, the sharing interface providing one or more first candidate conference events;
   obtaining a target conference event selected by the currently logged-in user from the one or more first candidate conference events, and obtaining an operation permission for the online document set by the currently logged-in user for the target conference event;
   obtaining a participant account number participating in the target conference event, and setting an operation permission of a participant corresponding to the participant account number for the online document based on the operation permission of the participant; and
   sending prompt information to the participant corresponding to the participant account number, such that the participant accesses the online document based on the prompt information.

2. The method of claim 1, wherein said providing the sharing interface based on the request from the currently logged-in user for sharing the online document further comprises:
   receiving a trigger operation of the currently logged-in user on a sharing control on a page where the online document is provided; and
   providing the sharing interface based on the trigger operation.

3. The method of claim 1, further comprising, prior to providing the sharing interface:
   obtaining one or more conference events recorded in a calendar of the currently logged-in user; and
   determining the one or more first candidate conference events based on the one or more conference events recorded in the calendar.

4. The method of claim 1, wherein the sharing interface further provides a search input box, and said obtaining the target conference event selected by the currently logged-in user from the one or more first candidate conference events further comprises:
   receiving a keyword related to the target conference event inputted by the currently logged-in user to the search input box;

obtaining, from the one or more first candidate conference events, one or more second candidate conference events matching the keyword; and obtaining the target conference event selected by the currently logged-in user from the one or more second candidate conference events.

5. The method of claim 1, wherein the sharing interface further provides a voice input interface, and obtaining the target conference event selected by the currently logged-in user from the one or more first candidate conference events further comprises:

obtaining voice information inputted by the currently logged-in user through the voice input interface, the voice information comprising content related to the target conference event;

determining one or more second candidate conference events matching the voice information based on conference information of the one or more first candidate conference events and the voice information; and obtaining the target conference event selected by the currently logged-in user from the one or more second candidate conference events.

6. An electronic device, comprising:

at least one processor and a memory communicatively connected to the at least one processor, wherein the memory stores instructions that when executed by the processor cause the electronics device to:

provide a sharing interface based on a request from a currently logged-in user for sharing an online document, the sharing interface providing one or more first candidate conference events;

obtain a target conference event selected by the currently logged-in user from the one or more first candidate conference events, and obtaining an operation permission for the online document set by the currently logged-in user for the target conference event;

obtain a participant account number participating in the target conference event, and setting an operation permission of a participant corresponding to the participant account number for the online document based on the operation permission of the participant; and send prompt information to the participant corresponding to the participant account number, such that the participant accesses the online document based on the prompt information.

7. The electronic device of claim 6, wherein the memory stores further instructions that when executed by the processor cause the electronic device to:

receive a trigger operation of the currently logged-in user on a sharing control on a page where the online document is provided; and provide the sharing interface based on the trigger operation.

8. The electronic device of claim 6, wherein the memory stores instructions that when executed by the processor cause the electronic device to, prior to providing the sharing interface:

obtain one or more conference events recorded in a calendar of the currently logged-in user; and determine the one or more first candidate conference events based on the one or more conference events recorded in the calendar.

9. The electronic device of claim 6, wherein the sharing interface further provides a search input box, and the memory stores further instructions that when executed by the processor cause the electronic device to:

receive a keyword related to the target conference event inputted by the currently logged-in user to the search input box;

obtain, from the one or more first candidate conference events, one or more second candidate conference events matching the keyword; and obtain the target conference event selected by the currently logged-in user from the one or more second candidate conference events.

10. The electronic device of claim 6, wherein the sharing interface further provides a voice input interface, and the memory stores further instructions that when executed by the processor cause the electronic device to:

obtain voice information inputted by the currently logged-in user through the voice input interface, the voice information comprising content related to the target conference event;

determine one or more second candidate conference events matching the voice information based on conference information of the one or more first candidate conference events and the voice information; and obtain the target conference event selected by the currently logged-in user from the one or more second candidate conference events.

11. A non-transitory computer-readable storage medium, storing computer instructions configured to cause a computer to implement a method for sharing an online document comprising:

providing a sharing interface based on a request from a currently logged-in user for sharing an online document, the sharing interface providing one or more first candidate conference events;

obtaining a target conference event selected by the currently logged-in user from the one or more first candidate conference events, and obtaining an operation permission for the online document set by the currently logged-in user for the target conference event;

obtaining a participant account number participating in the target conference event, and setting an operation permission of a participant corresponding to the participant account number for the online document based on the operation permission of the participant; and sending prompt information to the participant corresponding to the participant account number, such that the participant accesses the online document based on the prompt information.

12. The non-transitory computer-readable storage medium of claim 11, wherein said providing the sharing interface based on the request from the currently logged-in user for sharing the online document further comprises:

receiving a trigger operation of the currently logged-in user on a sharing control on a page where the online document is provided; and providing the sharing interface based on the trigger operation.

13. The non-transitory computer-readable storage medium of claim 11, wherein the method further comprises, prior to providing the sharing interface:

obtaining one or more conference events recorded in a calendar of the currently logged-in user; and determining the one or more first candidate conference events based on the one or more conference events recorded in the calendar.

14. The non-transitory computer-readable storage medium of claim 11, wherein the sharing interface further provides a search input box, and obtaining the target conference event selected by the currently logged-in user from the one or more first candidate conference events further comprises:
- receiving a keyword related to the target conference event inputted by the currently logged-in user to the search input box;
- obtaining, from the one or more first candidate conference events, one or more second candidate conference events matching the keyword; and
- obtaining the target conference event selected by the currently logged-in user from the one or more second candidate conference events.

15. The non-transitory computer-readable storage medium of claim 11, wherein the sharing interface further provides a voice input interface, and obtaining the target conference event selected by the currently logged-in user from the one or more first candidate conference events further comprises:
- obtaining voice information inputted by the currently logged-in user through the voice input interface, the voice information comprising content related to the target conference event;
- determining one or more second candidate conference events matching the voice information based on conference information of the one or more first candidate conference events and the voice information; and
- obtaining the target conference event selected by the currently logged-in user from the one or more second candidate conference events.

* * * * *